United States Patent [19]

Hobby et al.

[11] Patent Number: 4,480,595
[45] Date of Patent: Nov. 6, 1984

[54] INTERNAL COMBUSTION ENGINE

[76] Inventors: William M. Hobby, 244 Sylvan Blvd., Winter Park, Fla. 32789; Joseph M. Valdespino, 5023 Golf Club Pkwy., Orlando, Fla. 32808

[21] Appl. No.: 549,080

[22] Filed: Nov. 7, 1983

Related U.S. Application Data

[62] Division of Ser. No. 340,256, Jan. 18, 1982, Pat. No. 4,416,224.

[51] Int. Cl.³ .................... F02M 25/12; F02M 27/02
[52] U.S. Cl. ....................................... 123/1 A; 123/3; 123/DIG. 12; 123/525
[58] Field of Search ................... 123/1 A, 3, DIG. 12, 123/527, 52 E, 529, 577–578, 51 E, 519, 525; 48/190–192, 175

[56] References Cited

U.S. PATENT DOCUMENTS

| | | | |
|---|---|---|---|
| 3,602,202 | 8/1971 | Kobayashi | 123/1 A |
| 4,068,639 | 1/1978 | Cook | 123/1 A |
| 4,085,709 | 4/1978 | Tangi | 123/DIG. 12 |
| 4,308,840 | 1/1982 | Hiramatsu et al. | 123/519 |

Primary Examiner—William A. Cuchlinski
Attorney, Agent, or Firm—William M. Hobby, III

[57] ABSTRACT

An improvement to an internal combustion engine having a fuel system for feeding a hydrocarbon fuel-air mixture to the combustion chambers and an auxiliary fuel system which utilizes anhydrous ammonia dissociated into hydrogen and nitrogen gas for use as an auxiliary fuel with the hydrocarbon fuel-air mixture of the engine. The improvements provide for feeding ammonia gas from a relief valve on a storage tank for anhydrous ammonia into the bottom of the windshield wiper container for a vehicle having water therein to absorb the ammonia to prevent the release of the ammonia to the atmosphere. The improvements also provide for a first auxiliary fuel dissociator to dissociate the ammonia utilizing the exhaust heat of the engine and a second auxiliary fuel dissociator to dissociate ammonia until the engine generates sufficient heat for the operation of the first dissociator. A control system allows the engine to be switched from running only on a hydrocarbon fuel-air mixture to running on a lean fuel-air mixture whenever dissociated ammonia is being fed to the fuel system. The system is also providing for capturing undissociated ammonia following the dissociation and recycling the ammonia through the dissociator.

4 Claims, 6 Drawing Figures

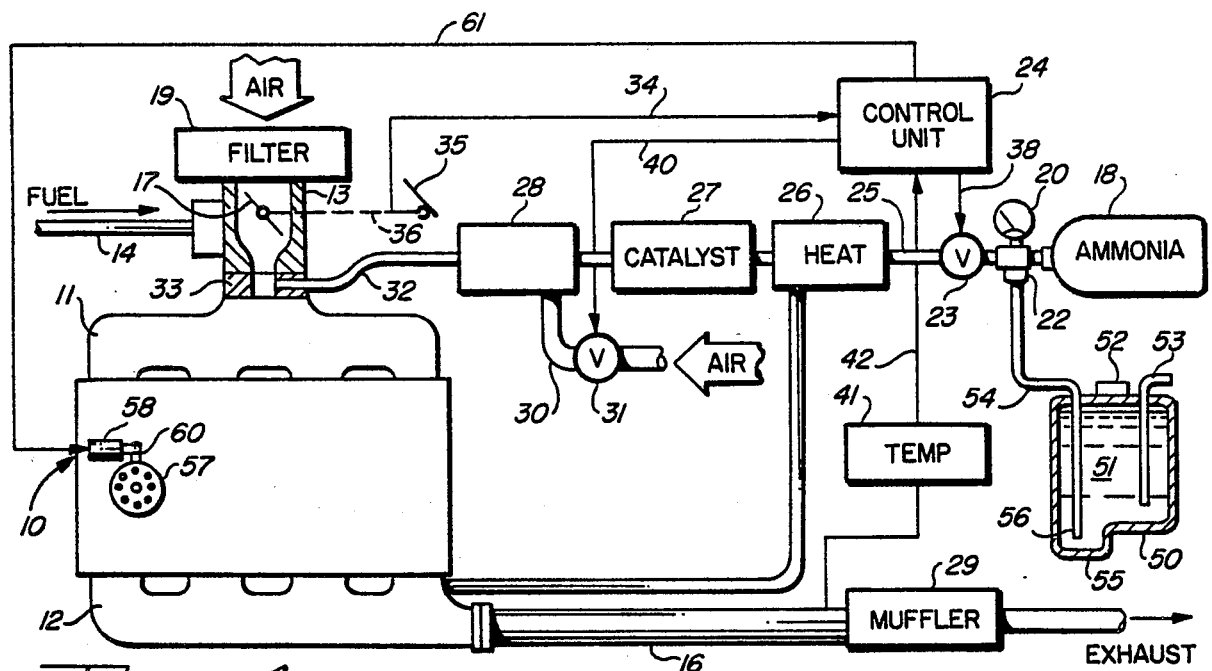
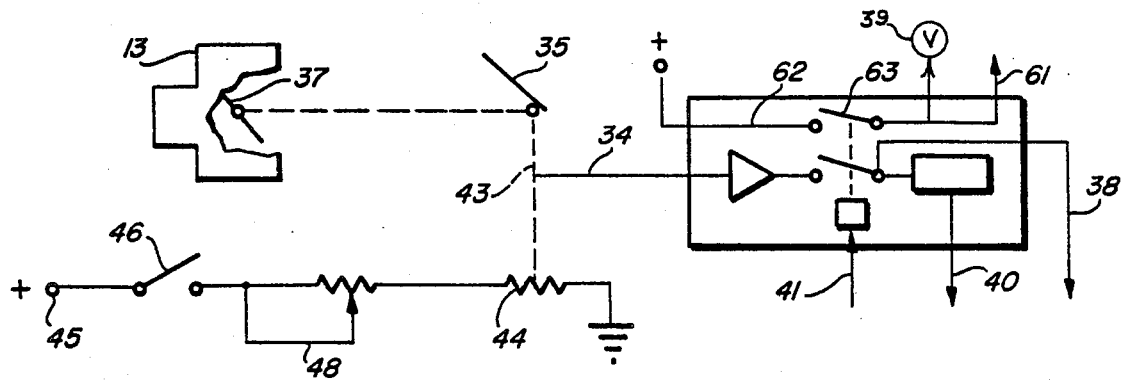
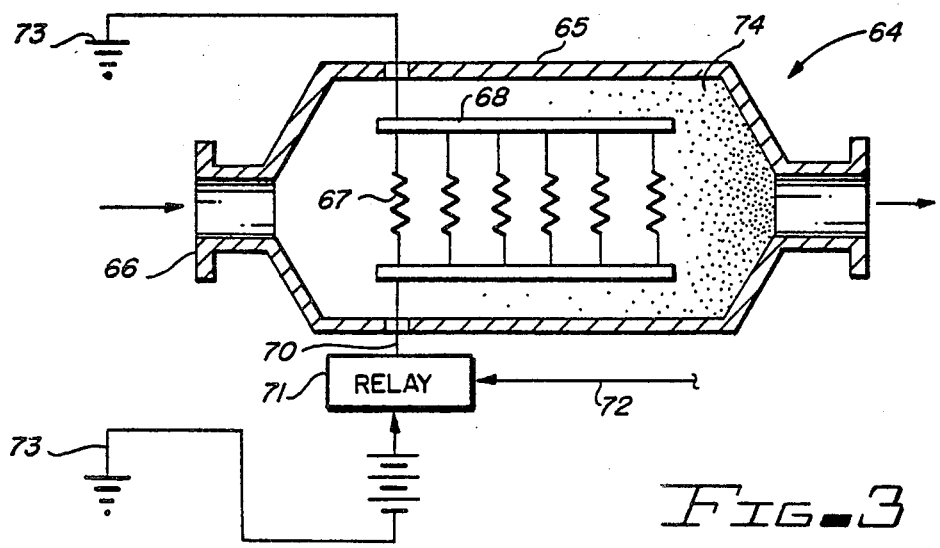

INTERNAL COMBUSTION ENGINE

This application is a division of application Ser. No. 340,256, filed Jan. 18, 1982, now U.S. Pat. No. 4,416,224.

BACKGROUND OF THE INVENTION

1. Field of the Invention

The present invention relates to internal combustion engines and especially to improvements in internal combustion engines having an auxiliary ammonia gas feed metering gas through a dissociation system into the combustion chambers along with the normal hydrocarbon fuel-air mixture of the engine while leaning the engine below its normal operating fuel-air mixture. This invention is an improvement over the invention in my co-pending U.S. patent application for an Internal Combustion Engine, Ser. No. 164,038, filed on June 30, 1980 now abandoned.

2. Description of the Prior Art

In the past, a variety of internal combustion engines have been provided and typically these engines have a system for feeding a hydrocarbon fuel, such as gasoline mixed with air into the combustion chamber for running the engine. Such engines typically also have an electrical system which includes a generator or an alternator which may be connected through an electrical regulating circuit for charging a storage battery and for operating the electrical components of the engine of the vehicle. Internal combustion engines sometimes have hydrocarbon fuels mixed with air in a carburetor where the mixture is distributed into the combustion chambers of the engine. It is also typical to feed the air to the combustion chambers using a fuel injection system for injecting fuel directly into the combustion chambers. The present invention can be adapted to operate with either a carburetor or fuel injection system.

A variety of hydrogen fueled engines have been suggested in the past, including those using combinations of hydrogen and oxygen, which in some cases are generated in an electrolytic cell having an electrolyte including solutions of salts, acids or bases in water. The electrolytic cell breaks the water down between hydrogen and oxygen through electrolysis and the hydrogen or the hydrogen and oxygen in combination can then be used to run the engine. The advantage of the hydrogen and oxygen as fuel is that it is an efficient fuel which generates no pollution in that the combustion forms water in very minute quantities. Such engines, however, have not been brought into general use because of the inefficiency in the generation of hydrogen and oxygen through electrolysis which takes far more power than can be generated from the hydrogen and oxygen used as a fuel, even in high efficiency engines.

It has also been suggested to use small amounts of hydrogen added to the hydrocarbon fuel-air mixture to increase the efficiency or reduce the pollution of the internal combustion engine. One prior patent, U.S. Pat. No. 3,906,913, discusses in detail the advantages of the use of small amounts of hydrogen with the hydrocarbon fuel-air mixture of a vehicle and points out that the advantages of reduced pollution and increased mileage result from running the engine much leaner than can otherwise be accomplished because the misfire limit for hydrocarbon fuels can be well exceeded. The carbon monoxide and $NO_x$ (oxides of nitrogen) emissions have been found to decrease as the fuel-air ratio is made leaner and if the fuel-air ratio can be made sufficiently lean, it can be made substantially free of CO and $NO_x$. This patent shows a hydrogen generator and means to control the feed of the hydrogen to the engine so that the conventionally fueled engine can be run very lean, well below where the engine would normally misfire as the engine approaches the flammability limit of the fuel. The normal flammability limit for hydrogen fuel-air mixtures occurs with a relatively high $NO_x$ formation rate and thereby imposes severe limitations on the lean limit operation for the fuel. Since hydrogen exhibits a flammability limit well below that of conventional hydrocarbon fuels, it is possible to reduce the $NO_x$ simply by using the hydrogen to change the fuel-air mixture to a much leaner mixture than would normally be allowed. The extension of the misfire limit to very lean equivalence ratios with hydrogen fuel also yields significant increases in the thermodynamic efficiency of the combustion process, thereby allowing a substantial increase in the mileage obtained on a conventional internal combustion fueled engine vehicle.

The difficulties in using hydrogen either as the sole fuel or in combination with a conventional internal combustion engine results from the hydrogen being a ubiquitous and very flammable gas, so that storage increases the hazards of operating the engine and in the general inefficiency in generating the hydrogen such as through electrolysis on the vehicle.

The present invention is directed toward the use of an ammonia gas used in combination with a conventional hydrocarbon fuel-air mixture to increase the efficiency of the engine and to reduce pollution in the engine. Ammonia has been mentioned as a constituent of various types of fuels in the past, both for internal combustion engines and for jet propulsion. One such fuel is a liquid mixture of ammonious nitrate in liquid ammonia which is a self-sustaining fuel combination requiring no addition of an oxident such as air. Ammonia is also used to manufacture hydrozene, a well known rocket fuel, and while ammonia does not support combustion, it will burn when mixed with oxygen in air to give a variety of products, principally nitrogen and water. Mixtures of nitrous oxide and ammonia in a rate of 3 to 2 will detonate with some violence yielding nitrogen and water.

One prior U.S. Patent showing the use of ammonia as constituent in fuel for internal combustion engines can be seen in the Drouilly U.S. Pat. No. 2,559,605, for a fuel mixture for internal combustion engines. In this patent, ammonia gas is fed from one storage cylinder into a pressure reducing chamber and a second bottle containing an auxiliary gas, such as ethanized illuminating gas, is fed into a second expansion chamber and the two gases are then fed into a mixing chamber, and from the mixing chamber into a carburetor. This patent also discusses the use of carbomonoxide, methyl ether, ethyl ether, methyl amine and ethyl amine in combination with ammonia. In the Meyer U.S. Pat. No. 1,671,158, a fuel for use in internal combustion engines consists of a mixtures of hydrocarbon distillates with ether and a highly volatile basic material, which may be ammonia. The mixture can then be used in internal combustion engines according to the patent. The Brooks U.S. Pat. No. 1,748,507 shows a process of reducing stable hydrocarbon oils in which ammonia or certain alkaline compounds are mixed with light hydrocarbon oils to prevent discoloration and sedimentation. In two of these U.S. patents, ammonia is used in small amounts in a fuel mixture, which may then be used as a fuel in an internal combustion engine; while in the Drouilly patent, expanded ammonia gas is mixed with another gas to form a gaseous fuel mixture for running an internal combustion engine.

Other prior U.S. patents utilizing ammonia as a fuel include U.S. Pat. No. 3,150,645 which uses a method of operating a compression ignition engine using ammonia as the primary fuel; U.S. Pat. No. 1,384,946 for a composite motor fuel which uses reagents admixed with the fuel to neutralize or destroy the corrosive products of explosive combustion in the engine cylinders, which include among other reagents, ammonia. In U.S. Pat. No. 4,223,642, a small amount of ammonia gas is obtained from ammonia bicarbonate or ammonia carbonate for use in the internal combustion engine. In U.S. Pat. No. 2,140,254 to Zafka, an internal combustion engine is operated on ammonia as a fuel by dissociating a small portion of the ammonia into hydrogen and nitrogen, utilizing exhaust heat, and then adding the dissociated gas back into the ammonia gas to run the engine. The hydrogen apparently extends the flammability limits of the ammonia so that it can be used as a fuel. Ammonia, however, has only about half the btu value per pound as gasoline, and therefore, by itself is not considered an efficient fuel. In addition, it's narrow flammability range makes it difficult to use as a fuel.

Other prior art patents can be seen in U.S. Pat. Nos. 4,036,180 and 4,230,072, both to Noguchi, et al., for fuel reforming systems for internal combustion engines reforming methanol; and in U.S. Pat. No. 1,899,869 for a gas engine; U.S Pat. No. 4,054,423 for a variable pressure fuel generator and method; and in U.S. Pat. Nos. 3,915,125, 4,121,542 and 3,963,000.

The advantage in using ammonia in the present invention is that ammonia is useful as a convenient means for transporting small volumes of hydrogen since the gas obtained by decomposition contain 75% by volume of hydrogen and 25% by volume of nitrogen. The ammonia is easily liquefied either by cooling to below its normal boiling point of $-33.42°$ C. or by compression and can be stored in a liquid state in small compression cylinders. Ammonia can be thermally dissociated in the presence of certain catalysts to give nitrogen and hydrogen and dissociation can also be affected by photochemical means or by passing an electrical discharge through the gas. Ammonia can be obtained a number of ways, but is normally prepared synthetically by a modification of the Haber process using pressures between 200 and 1,000 atmospheres and temperatures between 400° and 500° C. along with a variety of catalysts. The present invention advantageously can be adapted as an add-on to existing hydrocarbon fueled internal combustion engines, as well as designed for new vehicles and allows a substantial increase in the mileage obtained from the hydrocarbon fuels and a reduction of at least certain pollutants in the exhaust of a vehicle and since the dissociated ammonia is metered in accordance with the requirements of the engine and the leaning of the engine can be similarly controlled, the efficiency can be easily optimized for any particular internal combustion engine.

SUMMARY OF THE INVENTION

An improvement in an internal combustion engine which has an auxiliary fuel system for feeding an auxiliary fuel stored under pressure to the engine includes the following improvements.

A pressure tank for holding an auxiliary fuel, such as anhydrous ammonia, under pressure is juxtaposed adjacent an internal combustion engine and has a relief valve for relieving excessive pressure in the tank by releasing small amounts of auxiliary fuel therefrom. A container, such as the windshield washer container of a vehicle, which is partially filled with a material, such as water, adapted to absorb the auxiliary fuel, is mounted adjacent the internal combustion engine. A coupling line connects the pressure relief valve into the bottom portion of the container so that escaping gas through the relief valve will be absorbed in the material in the container rather than released into the atmosphere. In the case of a windshield washer container, the coupling extends to below the lowest level at which water is withdrawn from the container so that the end of the tube is always covered with water. The engine is also improved by having a first auxiliary fuel dissociation system for dissociating the auxiliary fuel, such as ammonia, into hydrogen and nitrogen, and feeding the dissociated fuel into the internal combustion engine when the engine has sufficient heat from the engine waste heat to dissociate the auxiliary fuel and a control system allows a second auxiliary fuel dissociator to be cut out when sufficient heat has built up in the first auxiliary fuel dissociator for dissociating ammonia.

The second auxiliary fuel dissociator can use an electric heater with a catalyst, or alternatively, can use a silent electrical discharge through the ammonia gas for dissociating the gas until the primary dissociator receives sufficient heat. The second auxiliary fuel dissociator allows the engine to be run lean at all times without having to switch from a lean to a normal engine and back during engine warm-up.

A control system can be provided for controlling the internal combustion engine using an auxiliary fuel which is dissociated to provide a source of hydrogen for use with the hydrocarbon fuel-air mixture, which can include an auxiliary feed control for controlling the auxiliary fuel initiation upon reaching a predetermined temperature in the ammonia dissociator and can include a system for automatically shifting the engine to a lean burning engine at the same time hydrogen is added to the fuel-air mixture of the engine and to simultaneously advance the spark for operating the engine under lean conditions. The controls can also vary the auxiliary fuel feed with engine conditions and with variations in the hydrocarbon fuel feed and may provide a switch for switching the auxiliary ammonia dissociator in and out in accordance with temperature conditions and for disabling a vacuum modulator in a closed loop system to shift the carburetor to its maximum lean position.

The engine is also improved with a gas separation means connected between the fuel dissociator and the engine to recover undissociated ammonia from the combined ammonia, hydrogen and nitrogen and feeding the ammonia back to the catalytic dissociator to prevent the engine from burning ammonia. The gas separator can use a divided container for bubbling the gas through water which absorbs the ammonia in the mixture while allowing the hydrogen to be fed to the engine. The ammonia captured in the water is released by heating it from the second part of the divided container where the gas is captured and fed back into the front portion of the catalytic dissociator. Cooling fins on the ammonia capturing side of the container maintains the water cooled than on the removing side where the ammonia is being separated from the water.

BRIEF DESCRIPTION OF THE DRAWINGS

Other objects, features and advantages of the present invention will be apparent from the written description and the drawings, in which:

FIG. 1 is a diagrammatic view of an internal combustion engine fuel system in accordance with the present invention;

FIG. 2 is a circuit diagram for the electronic control for the internal combustion engine of FIG. 1;

FIG. 3 is a sectional view of an auxiliary fuel dissociator;

DESCRIPTION OF THE PREFERRED EMBODIMENTS

Figure 4:
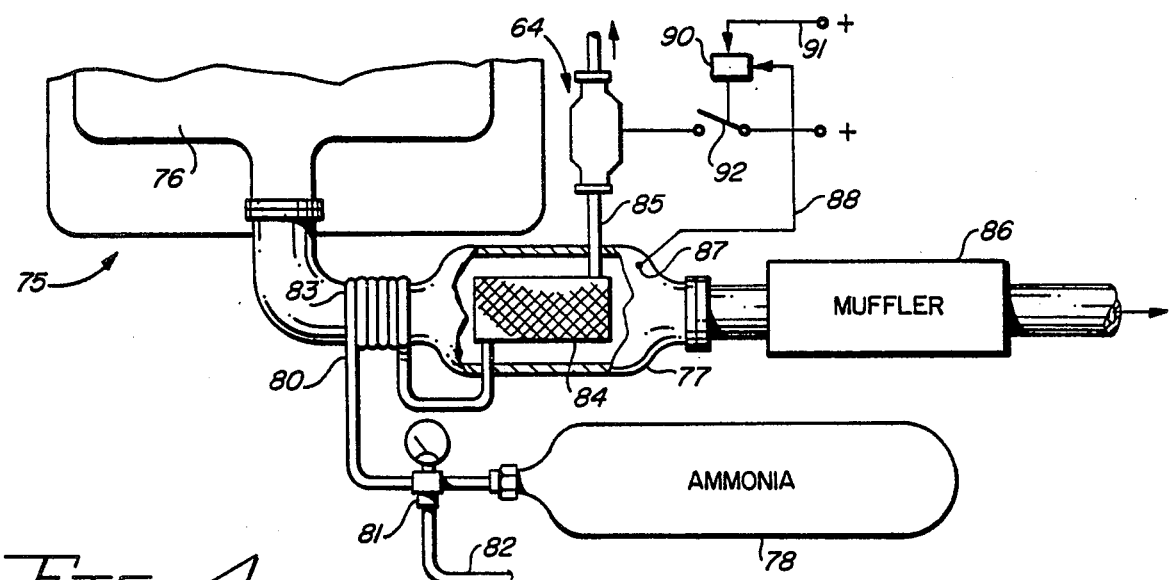
FIG. 4 is a diagrammatic view of an auxiliary fuel system utilizing a second auxiliary fuel dissociator.

Referring to FIG. 1 of the drawings, an internal combustion engine 10 is illustrated with a carburetor 13 feeding into an intake manifold 11 feeding into the engine block, which also has an exhaust manifold 12 connected thereto. The engine 10 is a standard internal combustion engine using refined hydrocarbon fuels fed from a fuel tank (not shown) through a fuel line 14 to the carburetor 13 while air from the atmosphere is fed through an air filter 19 into the carburetor 13. A throttle 17 located in the carburetor 13 is connected by throttle linkage 36 to the accelerator pedal 35 for controlling the speed of the engine 10 by varying the fuel-air flow through the carburetor. A fixed venturi carburetor is illustrated, but it should be clear that the invention will work equally well with a fuel injection engine or a variable venturi carburetor without departing from the spirit and scope of the invention. The exhaust manifold 12 has an exhaust pipe 16 connected thereto through a muffler 29. The exhaust pipe might also have a three way catalyst catalytic converter therein. An ammonia tank 18 for the storage of liquid anhydrous ammonia is connected to a valve 20 and has a pressure relief valve 22 connected thereto for relieving pressure should the pressure in the ammonia tank 18 exceed the set pressure of the valve 22. Such might happen if the ammonia tank 18 got heated up above a predetermined temperature while being substantially filled with liquid ammonia. Ammonia tank 18 is connected through a valve 23 which is a variable solenoid control valve controlled by a control circuit of FIG. 2 for varying the feed of ammonia to the engine 10. Ammonia is fed through the ammonia line 25 where it may be either a liquid or gaseous state, as desired. However, it is then fed into an ammonia catalytic dissociator separated to show heat 26 and a catalyst 27, even though it should be clear that one combined unit is utilized. The heat is shown being fed from the exhaust manifold 12, but it should also be clear that this is a diagrammatic illustration since the catalytic dissociator would normally be mounted right to the end of the exhaust manifold 12. Once a predetermined temperature range is reached in the ammonia dissociator, the ammonia being fed from the tank 18 is fed as a gas through the dissociator where it is dissociated into hydrogen and nitrogen and may have a small amount of ammonia still therein. The catalyst used may be iron and nickel and may include osmium, zinc, uranium, or other known catalysts utilized in dissociating ammonia. The catalyst can be coated onto or formed with a ceramic honeycomb material or other material similarly used in three way catalytic converters and which is not readily damaged by high temperature. The dissociated ammonia is fed into a mixing box 28 where it is mixed with air from the line 30, which air is controlled by a varying solenoid valve 31 controlled by the control unit 24, as shown in FIG. 2, to vary the amount of air in accordance with the amount of ammonia being fed depending upon the engine operating conditions.

The mixed air and dissociated ammonia is fed through the line 32 through an adapter plate 33 mounted between the carburetor and the intake manifold. It will, of course, be clear that the auxiliary fuel and air can be fed at any position desired into the carburetor or intake manifold, but needs to be controlled to be varied in accordance with engine conditions, just as the flow of hydrocarbon fuel and air is controlled.

A control unit 24 operates a valve 23 through an electrical conductor 38 and a valve 31 through an electrical conductor 41. The control unit receives a temperature reading from the temperature sensor 41 through the conductor 42 to determine when sufficient heat is reached to dissociate the ammonia and thereby start feeding the ammonia and added air to the engine. A control unit also has a conductor 61 which controls an electrical solenoid 58 connected to the distributor 57 through an arm 60 so that the entire distributor can be shifted to advance the spark of the engine 10 at the same time the engine is being leaned down by the addition of air through the line 30 and of auxiliary dissociated fuel fed thereinto. The air and auxiliary fuel are controlled by the accelerator linkage 36 which is connected through a line 34 to the control unit 24.

The pressure relief valve 22 has a line 54 coupled to the output thereof and to a container 50, which may be the windshield wiper container for a vehicle, and which is filled with water 51 (or water having other chemicals therein), which readily absorbs the ammonia. One volume of water will absorb approximately seven hundred volumes of ammonia gas while making the water 51 a better windshield cleaning agent. Additives for windshield washer containers typically already have ammonia therein. The container 50 may have a deeper bottom for receiving the end 56 of the pipe 54 so that the end 56 will always be covered with water 51, even though the windshield washer tube 53 has emptied the container 50 as far as it can. The container will also have a cap 52 for adding water thereto. This simple modification advantageously prevents the relief valve from releasing any ammonia into the atmosphere while increasing the safety of the storage of the ammonia 18 and improving the ability of the windshield washer of a vehicle to clean the windshield.

In the case of stationary engines, however, a separate water container might be used or in an open area the ammonia can be vented to the atmosphere, since ammonia is commonly manufactured in the atmosphere and is a common way of fixing nitrogen for use by plants.

The control unit in FIG. 2 is a simplified electrical control embodiment of the invention, but it should be clear that a next generation control unit might typically include an integrated circuit, such as a programed microprocessor for receiving control signals not only from the throttle and temperature sensors, but other engine conditions as well, and for automatically controlling the advance of the timing and operating conditions of the engine. In this embodiment, the accelerator pedal 35 is connected through a linkage 43 to the movable contact of a potentiometer 44 which is connected from an electrical terminal 45 through the ignition switch 46 through the potentiometer 44 through a line 34 to the control unit 24 to thereby vary the voltage in the line 34 to control the unit 24. A variable resistance 48 can be used to determine the minimum value of the signal of the moving contact of the potentiometer 44. The control unit 24 may include an amplifier for amplifying the signal from the line 34, as well as a relay or solenoid switch actuated by thermal sensor (or thermostat) 41. The thermal switch disables the control unit 24 until a sufficient temperature is reached in the exhaust manifold for dissociating the ammonia and allows the engine to run in a normal manner on a hydrocarbon fuel-air mixture. This prevents ammonia and air from being fed into the unit until sufficient heat is available to dissociate a portion of the ammonia and from leaning the engine down prematurely to a condition in which the engine wouldn't run. A momentary delay circuit can momentarily delay the signal in the line 40 to the valve 31 to assure that the air and ammonia will reach the coupling plate 33 at the same time, so as not to momentarily lean the engine 10 down prior to ammonia being fed to the engine. The thermal switch 41 operates a double pole, double throw switch with the switch controlling the valve 31 also having a connection line 38 connecting to the valve 23. A second switch 63 is connected from an electrical terminal through a line 62 through the switch 63 to an output line 61 which in turn is connected to the solenoid 58 for simultaneously advancing the spark of the engine 10 as the dissociated ammonia and air is fed to the engine with the normal hydrocarbon air-fuel mixture. This switch also actuates a solenoid valve or relay 39 in those engines using a closed loop engine control. In a controlled loop engine control, an oxygen sensor is mount-d in the exhaust manifold of the engine for determining the air-fuel mixture of the engine. This is used because a three way catalyst is most effective within a narrow range of air-fuel ratios which is slightly on the rich side of stoichiometric air-fuel ratios (15:1). To reduce emissions requires that the engine be run within this narrow fuel-air ratio and an oxygen sensor utilizing zirconium coated with platinum advantageously indicates the amount of oxygen in the exhaust and whether the engine is running lean or rich or to either side of the narrow range that the three way catalyst is optimized. This signal is normally fed to the microprocessor but may be fed to a simple analog or digital control for controlling a vacuum modulator or an electric motor or a solenoid. The vacuum modulator or electric motor responds responsive to a signal generated responsive to the oxygen sensor signals to drive a mixture control piston in the carburetor (or the vacuum in a fuel bowl), which simultaneously leans and enrichens the carburetor high speed jet, as well as the idle mixture feed. This is typically done with a constant vacuum modulator varying the vacuum by a solenoid valve responding to the signals generated from the oxygen sensor signals to allow atmospheric air to be fed to the vacuum. In a system using an electric motor, the motor is driven forward of backward, depending upon which terminal receives the current to move tapered metering rods so that a relay can switch the terminal connections to maintain a lean fuel-air mixture when the oxygen sensor reads too lean. The vacuum modulator system can be disabled by grounding the electrical connections to the vacuum modulator, but it is more desirable to use a solenoid valve to close off the air intake to the vacuum modulator so that the vacuum is always supplied to the mixture controlled piston, thereby always reading at its maximum lean position to assist in leaning the engine when the engine is switched over to an auxiliary fuel. The use of this system in a retrofit vehicle, however, requires the approval of the appropriate Governmental agencies, since it modifies an existing air pollution control device. However, the present system is such that the normal three way catalyst can be eliminated since it has been shown that $NO_x$ emissions form a curve in relation to the fuel-air ratio which reaches its maximum very near the stoichometric mixture and drops off rapidly as the engine is leaned down. An electronic lean burning system such as used by the Chrysler Corporation at one time can reduce the $NO_x$ emissions as well as CO and hydrocarbon emissions by leaning the engine down to an approximately 18:1 fuel-air ratio, which approaches the upper limit lean burn for most engines. The emissions curves show that leaning an engine down to a fuel-air ratio of 22:1 substantially eliminates both $NO_x$ and carbon monoxide emissions, while the hydrocarbons tend to increase. However, hydrocarbons are much easier handled, and since the lean burning of the present invention is accomplished by the use of added hydrogen and nitrogen, it is believed that the hydrocarbons would also be reduced.

Figure 5:
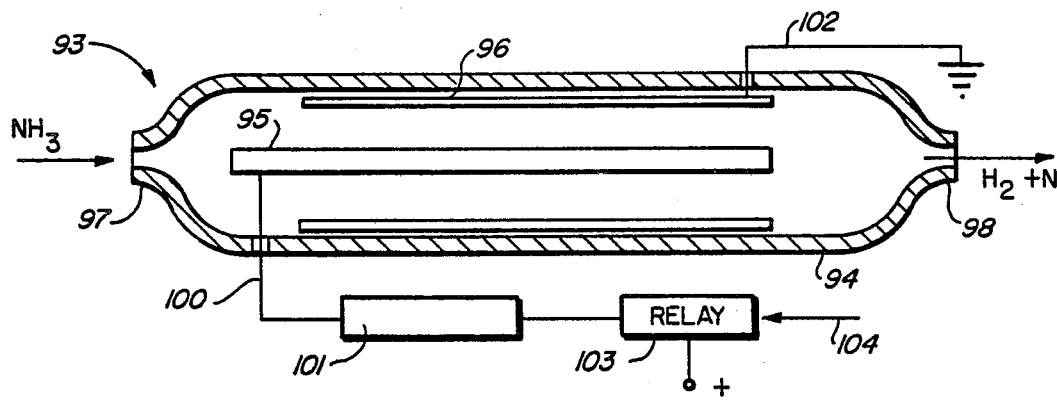
FIG. 5 is a sectional view of a second embodiment of an auxiliary dissociator utilizing a silent electrical discharge.

Turning now to FIGS. 3 through 5, an internal combustion engine in accordance with the present invention is shown with a second auxiliary ammonia dissociator 64 illustrated for dissociating ammonia with a cold engine so as to maintain the engine in a leaned down and advanced spark system without having to switch back and forth as illustrated in connection with FIGS. 1 and 2. In FIG. 3, an auxiliary ammonia dissociator 64 has a casing 65 being partially filled with the catalyst 74. The casing 65 has an inlet opening 66 having a flange and an outlet opening at the other end thereof. Electrical bus bars 68 are mounted inside the casing 65 and have electrical elements 67, which may be of a nichrome (nickel and chromium alloy) type resistance heating elements, which advantageously makes a good catalyst for the catalytic dissociation of ammonia. One bus bar 68 is connected to a ground 73 while the other is connected to an electrical line 70 through the casing 65 to a relay 71. The relay is actuated by a line 72 which may be connected to a thermal sensor or thermostat for disengaging the relay once the exhaust manifold is heated sufficiently to operate the normal catalytic dissociator. A battery is shown connected to the relay being grounded by line 73. This embodiment would be placed in an engine as illustrated in FIG. 4 following a normal catalytic dissociator 77 and would be switched out as soon as sufficient heat in the catalytic dissociator 77 allowed the catalyst chamber 84 to dissociate the ammonia.

The embodiment of FIG. 3 would normally require a short heating period, such as required by glow plugs in diesel engines, to heat up sufficiently to dissociate the ammonia for starting the engine. A thermal sensor 87 is connected through a line to a solenoid actuated switch or relay 90 which actuates the switch 92. Switch 92 is normally open and is closed when there is insufficient temperature from the sensor 87 to thereby actuate the heating elements 67 of FIG. 3. An electrical line 91 is connected to the relay to actuate the relay 90.

FIG. 4 has the exhaust manifold 76 of the engine 75 connected to the catalytic dissociator 77 to pass exhaust gases and heat around the catalyst chamber 84 and out the exhaust pipe and muffler 86. The ammonia stored in ammonia tank 78 is fed through a pressure relief valve 81 which has a coupling line 82 which can be coupled to a windshield washer container as illustrated in FIG. 1. Line 80 couples the ammonia tank 78 around a coiled preheater wrapped around an exhaust pipe portion of the catalytic dissociator 77 prior to the ammonia gas going into the catalyst chamber 84 and from the catalyst chamber 84 through the line 85 and into the second auxiliary catalytic dissociator 64 into the carburetor or intake manifold of the engine.

FIG. 5 shows an alternate embodiment for temporarily dissociating ammonia until the engine heat allows the primary catalytic dissociator to become operational. The auxiliary dissociator 93 has a casing 94 which can be a ceramic material as desired and has a central electrode 95 along with a spaced electrode 96 which may be a thin metal plate wrapped around the cylindrical housing 94. The electrode 96 can also be placed outside of the housing 94 or formed within the housing rather than located inside, as shown in the drawing. The housing 94 has an inlet 97 for ammonia to be fed to the dissociator and an exit 98 for the egress of hydrogen and nitrogen. The electrode 96 is connected through a line 102 to ground, while the electrode 95 is connected through a line 100 to a tesla coil and vibrator 101 for increasing the voltage applied to the electrode 95. A relay 103 is connected to box 101 to apply a voltage when the relay is actuated from the line 104. Line 104 operates the same as in FIG. 4 to disengage the dissociator when sufficient heat is reached by the temperature sensor 87, so that the primary ammonia dissociator is operational. In lieu of a temperature sensor, a hydrogen sensor can be placed in the line 85 of FIG. 4 to indicate when hydrogen is being fed from the catalytic dissociator 84 to thereby switch off the auxiliary dissociator 64. The dissociator in FIG. 4 works on the basis that a silent electrical discharge through an ammonia gas will dissociate the ammonia gas, and while this takes a certain amount of electrical power, it has the advantage of being a substantially instantaneous dissociation and is only operational for a short period of time, so that the engine can be started immediately and remain leaned down in operation at all times without the cut-ins and outs of air and ammonia, as well as advancing the spark upon appropriate conditions being reached.

Figure 6:
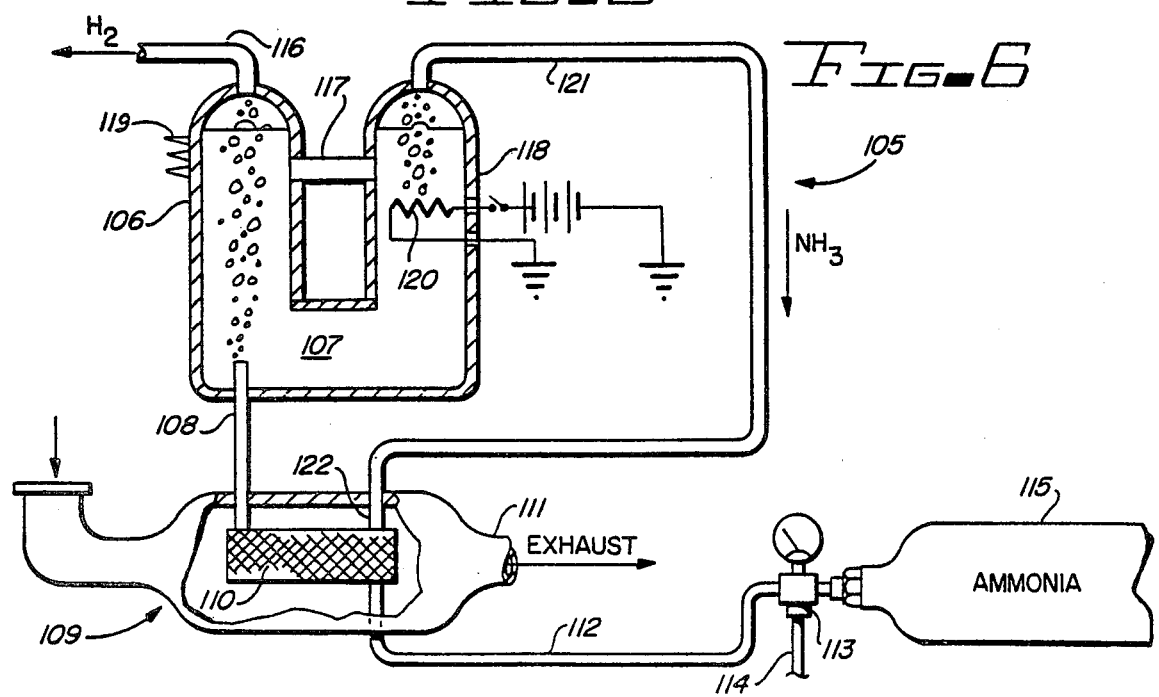
FIG. 6 is a cutaway section and diagrammatic view of an ammonia separator for use in the present invention.

Turning now to FIG. 6, an ammonia separator is illustrated connected to the ammonia dissociator. The catalystic dissociator 109 is connected to the exhaust manifold and has a catalyst chamber 110 therein. The ammonia separator has a dual chamber 106 and 118 filled with water 107 or other material for absorbing ammonia. Ammonia gas is fed from the compressed ammonia tank 115 through pressure relief valve 113 which has a line 114 coupled as desired to a container, such as a windshield washer container, as shown in FIG. 1. The line 112 couples the ammonia tank 115 to the ammonia dissociator 109, catalyst chamber 110 and from there through line 108 into the ammonia separator 106. Dissociated gas would normally contain primarily hydrogen and nitrogen, but generally contains a residue of ammonia in a typical dissociation by heated catalyst. Bubbling gas through the water 107 allows the hydrogen and nitrogen to be collected at the top and fed to the engine while any residue ammonia will be trapped in the water 107. One volume of water will hold approximately seven hundred volumes of ammonia gas at normal temperatures. Two chambers 106 and 118 are connected by pipe 117 and also along the base. Chamber 118 has an electrical heating element 120 operated by the battery and connected through a switch and is connected fairly near the surface of the liquid in the container 118. Heating the water to boiling will remove all of the ammonia gas from the water. The gas is collected on the top of the container 118 and fed through the pipe 121 back through the opening 122 into the catalyst bed 110. The heater 120 can be cycled on and off as needed. Inasmuch as the heater is heating the liquid, cooling fins 119 are provided on chamber 106 to keep this liquid as cool as possible to hold a larger percentage of ammonia relative to the chamber 118 top portion which is being heated to remove the ammonia.

The ammonia separator 105 advantageously can be utilized with those engines having parts therein which are corroded by ammonia. However, it should be clear that small amounts of ammonia in a hydrocarbon atmosphere will burn and there has been an indication that it might even reduce emissions from an internal combustion engine. However, since the btu fuel value of a pound of ammonia is about half that of a pound of gasoline, the ammonia is better utilized being dissociated to utilize the hydrogen for leaning the internal combustion engine to improve the engine's efficiency and to reduce emissions.

It should be clear at this time that an improvement to an internal combustion engine using dissociated ammonia as an auxiliary fuel has been illustrated which can be utilized in a normal hydrocarbon fuel-air operation mode or can be switched to a leaned down engine of higher efficiency utilizing hydrogen dissociated from ammonia and varied in accordance with the operating conditions of the engine to drive the engine. It should also be clear that a system has been provided for starting the engine on a leaned basis utilizing hydrogen generated by the waste heat catalytic dissociator and a means to improve the efficiency of the dissociation of the ammonia. Accordingly, the present invention is not to be limited to those forms shown, which are to be considered illustrative rather than restrictive.

I claim:

1. An improvement in an internal combustion engine having an auxiliary fuel system for feeding an auxiliary fuel stored under pressure to the internal combustion engine comprising in combination:
   a storage tank for holding an ammonia under pressure;
   a relief valve positioned on the outlet of said storage tank to relieve excessive pressure in said tank by releasing auxiliary fuel therefrom;
   a container partially filled with water adapted to absorb said ammonia; and
   a coupling attached to said relief valve and connected into said container whereby auxiliary ammonia released by said auxiliary fuel tank is captured in said container to prevent release thereof to the atmosphere.

2. An improvement in an internal combustion engine in accordance with claim 1 in which said container acts as a windshield washer liquid container for a vehicle having said internal combustion engine therein.

3. An improvement in an internal combustion engine in accordance with claim 2 in which said coupling is attached to said container below the outlet tube opening for the vehicle windshield wiper tube, whereby the opening from said coupling will always be beneath the liquid level in said container.

4. An improvement in an internal combustion engine in accordance with claim 3 in which said container is formed with a well extending below the normal bottom of said container and said coupling extends into said well, whereby the end of said coupling form said relief valve is always under a predetermined minimum depth of liquid.

* * * * *